(12) United States Patent  (10) Patent No.: US 8,441,504 B2
Sakanoue et al.  (45) Date of Patent: May 14, 2013

(54) IMAGE PROCESSING APPARATUS, IMAGE PROCESSING METHOD, AND STORAGE MEDIUM

(75) Inventors: Ryuhei Sakanoue, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 946 days.

(21) Appl. No.: 12/473,716

(22) Filed: May 28, 2009

(65) Prior Publication Data

US 2009/0310022 A1  Dec. 17, 2009

(30) Foreign Application Priority Data

Jun. 17, 2008  (JP) ................................ 2008-158282

(51) Int. Cl.
*G09G 5/10*  (2006.01)
(52) U.S. Cl.
USPC .......................................... 345/690; 345/102
(58) Field of Classification Search .................. 345/87, 345/102, 204, 690–697
See application file for complete search history.

(56) References Cited

U.S. PATENT DOCUMENTS

| | | | | |
|---|---|---|---|---|
| 6,380,943 B1 * | 4/2002 | Morita et al. | ................. | 345/589 |
| 6,795,053 B1 * | 9/2004 | Funamoto et al. | ............ | 345/102 |
| 6,980,180 B2 * | 12/2005 | Hasagawa | ....................... | 345/77 |
| 7,106,350 B2 * | 9/2006 | Baba et al. | .................... | 345/691 |
| 7,265,743 B2 | 9/2007 | Funamoto et al. | | |
| 7,289,100 B2 * | 10/2007 | Sohn et al. | ..................... | 345/102 |
| 7,414,608 B2 | 8/2008 | Funamoto et al. | | |
| 7,443,377 B2 * | 10/2008 | Kim | .............................. | 345/102 |
| 7,515,119 B2 * | 4/2009 | Kim et al. | ....................... | 345/63 |
| 7,522,135 B2 * | 4/2009 | Baik | ............................... | 345/88 |
| 7,982,730 B2 * | 7/2011 | Correa et al. | ................ | 345/212 |

FOREIGN PATENT DOCUMENTS

| | | |
|---|---|---|
| JP | 8-201812 | 8/1996 |
| JP | 2001-22318 | 1/2001 |
| JP | 2001-27890 | 1/2001 |
| JP | 2001-136548 | 5/2001 |
| JP | 2002-99250 | 4/2002 |
| JP | 2006-119465 | 5/2006 |

\* cited by examiner

*Primary Examiner* — Dmitriy Bolotin
(74) *Attorney, Agent, or Firm* — Oblon, Spivak, McClelland, Maier & Neustadt, L.L.P.

(57) ABSTRACT

An image processing apparatus includes a control amount calculating unit configured to calculate an equivalent electric power value using a pixel value of an input video signal, the equivalent electric power value corresponding to an amount of energy involved when an image based on the video signal is displayed on a display unit, and to calculate a control amount for controlling display luminance of the display unit so that the equivalent electric power value becomes equal to a predetermined value, and a correction processing unit configured to control the display luminance using the control amount calculated by the control amount calculating unit.

2 Claims, 8 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium. More specifically, the present invention relates to an image processing apparatus, an image processing method, and a storage medium for use in, for example, a television broadcaster to check an image to be displayed at a receiver.

2. Description of the Related Art

For instance, television broadcasters or video content distributors perform quality checks or the like before broadcasting or distributing programs (content). The quality checks are generally performed by displaying images of the programs on display devices (monitors).

For example, Japanese Unexamined Patent Application Publication No. 2001-136548, the disclosure of which is incorporated herein by reference, describes a technique in which a display device capable of switchably displaying an original image and a processed image produced by processing the original image is provided with a built-in quality evaluator for evaluating the quality of the processed image so that a quality evaluation result output from the quality evaluator can be displayed on a display unit of the display device.

SUMMARY OF THE INVENTION

Various types of display devices are available for receivers at homes and the like for receiving television broadcasts or content. Examples of display devices currently available for use in homes include liquid crystal displays (LCDs), plasma display panels (PDPs), organic electroluminescent (EL) displays, and cathode ray tube (CRT) displays.

Among these displays, PDPs and CRT displays are configured to display images on screens using light emission due to discharge. Therefore, in order to suppress the generation of heat from display devices, extend product lifetime, or reduce electric power consumption, the signal level of an input video signal having a predetermined signal level (pixel value) or higher is limited and is output to the display devices.

FIG. 9 shows an exemplary process for limiting the output signal level. In FIG. 9, the relationship between the luminance level of light emitted from the front surface of a display device and the white display area ratio is illustrated. In the following description, the luminance of light emitted from the front surface of a display device is referred to as "display luminance". In FIG. 9, display luminance level is plotted on the ordinate, and white display area ratio (which is expressed in as a percentage (%)) is plotted on the abscissa. The left end of the abscissa, i.e., a white display area ratio of 0%, corresponds to a state where a black image is displayed in a full-screen manner, and the right end of the abscissa, i.e., a white display area ratio of 100%, corresponds to a state where a white image is displayed in a full-screen manner. In FIG. 9, the broken line indicates the display luminance of an LCD, and the solid line indicates the display luminance of a PDP.

As shown in FIG. 9, an LCD has a constant, unchanging level of display luminance even when the white display area increases on the display screen. This is because in LCDs, a backlight emits light onto a rear surface of a display panel with constant brightness regardless of characteristics of the image state such as the white display area.

On the other hand, a PDP has a high luminance level when a white, high-luminance area is small in size. As the size of the white area increases, the luminance level decreases. This is because in PDPs, the signal level of a high-luminance signal, which consumes more electric power, is limited to keep the electric power consumed for display below a certain level. This characteristic of PDPs is also referred to as "peak luminance characteristic".

In this manner, image display techniques differ depending on the type of display device. Thus, the qualities of images to be displayed on display devices also differ depending on the type of display device even when identical images are input. In order to perform quality checking of images as described above, a plurality of types of display devices having different display characteristics are prepared and images used for checks are actually displayed on the display devices.

However, it is time-consuming to actually prepare display devices for displaying images used for checks, which correspond to individual types of display devices targeted for quality checks. In order to overcome this problem, it has been desirable to provide some means for checking images to be displayed on a plurality of different display devices using a single display device.

For example, it is assumed that an image to be displayed on a device configured to limit the level of display luminance in accordance with the magnitude of the signal level of a video signal, such as a PDP, is reproduced on a device not configured to limit display luminance, such as an LCD. In this case, it is necessary to reproduce the PDP luminance characteristic as indicated by the solid line in FIG. 9 on the screen of the LCD. In other words, it is necessary to use the amount of energy involved in the display of a video signal as a feature value to perform display luminance control.

Japanese Unexamined Patent Application Publication No. 8-201812, the disclosure of which is incorporated by reference, describes a technique for controlling the level of display luminance using a display device not configured to limit display luminance. In this technique, the average picture level (APL) of an input video signal is calculated, and the brightness of a backlight of an LCD is adjusted in accordance with the magnitude of the calculated APL to control the display luminance. The control of the display luminance is performed in order to improve image quality (achieve high image quality).

However, if the luminance signal value is used as a feature value in the manner described above, it is difficult to reproduce the luminance characteristic of a display device such as a PDP. This is because in a color display device such as an LCD, changes in the intensity of light of three primary colors, i.e., red (R), green (G), and blue (B), are used to display variations of color tones or brightness. In order to calculate the amount of energy involved in the display on such a display device, it is necessary to individually calculate the amounts of energy involved in displaying RGB colors. However, only luminance signal information is not sufficient to calculate the respective energy amounts.

A luminance signal Y can be expressed by, for example, the equation $Y=0.2 \times R+0.7 \times G+0.1 \times B$. According to this equation, even a large change in the blue signal (B signal) which has a low contribution level to the luminance signal Y would cause substantially no change in the value of the luminance signal Y. In actuality, however, a large change in the B signal will increase the voltage applied to a blue (B) pixel. In other words, the amount of energy involved in the display also greatly changes. Thus, if the luminance signal Y is used as a feature value for calculating the amount of energy involved for a display device, a problem arises in that the luminance characteristic of a display device such as a PDP is not precisely reproducible.

The luminance signal Y is originally produced in accordance with the sensitivity of the human visual system, rather than representing the energy involved in displaying an image on a display device. Thus, in order to improve image quality, as in the above-described technique described in Japanese Unexamined Patent Application Publication No. 8-201812, the desired effect can be achieved by adjusting display luminance on the basis of a luminance signal value which has a substantial effect on human visual perception.

However, the control based on such a luminance signal is not sufficient to reproduce, using a display device such as an LCD, an image to be displayed on a display device configured to limit display luminance in consideration of the amount of energy involved in displaying a video signal, such as a PDP.

Further, U.S. Pat. Nos. 6,795,053, 7,265,743, and 7,414,608 (corresponding to Japanese Unexamined Patent Application Publication No. 2001-27890), the disclosures of all of which are incorporated herein by reference, describe the adjustment of display luminance based on an APL and maximum and minimum values of an input video signal which are detected. However, it is difficult to accurately calculate the amount of energy involved in the display of a video signal even when the APL and the maximum and minimum values are used. That is, there is a problem in that the control based on an APL, maximum and minimum values, and the like of an input video signal does not allow for the reproduction of an image to be displayed on a display device such as a PDP.

It is therefore desirable to ensure that an image to be displayed on a display device configured to limit display luminance in accordance with the signal level of an input video signal is reproduced on a display device not configured to limit display luminance.

According to an embodiment of the present invention, an image processing apparatus includes a control amount calculating unit configured to calculate an equivalent electric power value using a pixel value of an input video signal, the equivalent electric power value corresponding to an amount of energy involved when an image based on the video signal is displayed on a display unit, and to calculate a control amount for controlling display luminance of the display unit so that the equivalent electric power value becomes equal to a predetermined value; and a correction processing unit configured to control the display luminance using the control amount calculated by the control amount calculating unit.

Therefore, an equivalent electric power value calculated on the basis of a pixel value of an input video signal is controlled to become equal to a predetermined value.

According to the embodiment of the present invention, an allowable electric power value that is allowed to be consumed by a display device configured to limit display luminance in accordance with the magnitude of a pixel value of an input video signal is set as a predetermined value, and an equivalent electric power value calculated on the basis of the pixel value of the input video signal is controlled to become equal to the predetermined value. Therefore, an image to be displayed on the display device configured to limit display luminance in accordance with the magnitude of the pixel value of the input video signal can be reproduced.

DESCRIPTION OF THE PREFERRED EMBODIMENTS

An embodiment of the present invention will be described with reference to FIGS. 1 to 8. An image display apparatus according to the present embodiment is implemented by an LCD and is configured to reproduce (or emulate) an image to be displayed on a PDP.

An example overall structure of the image display apparatus will be described.

Figure 1:
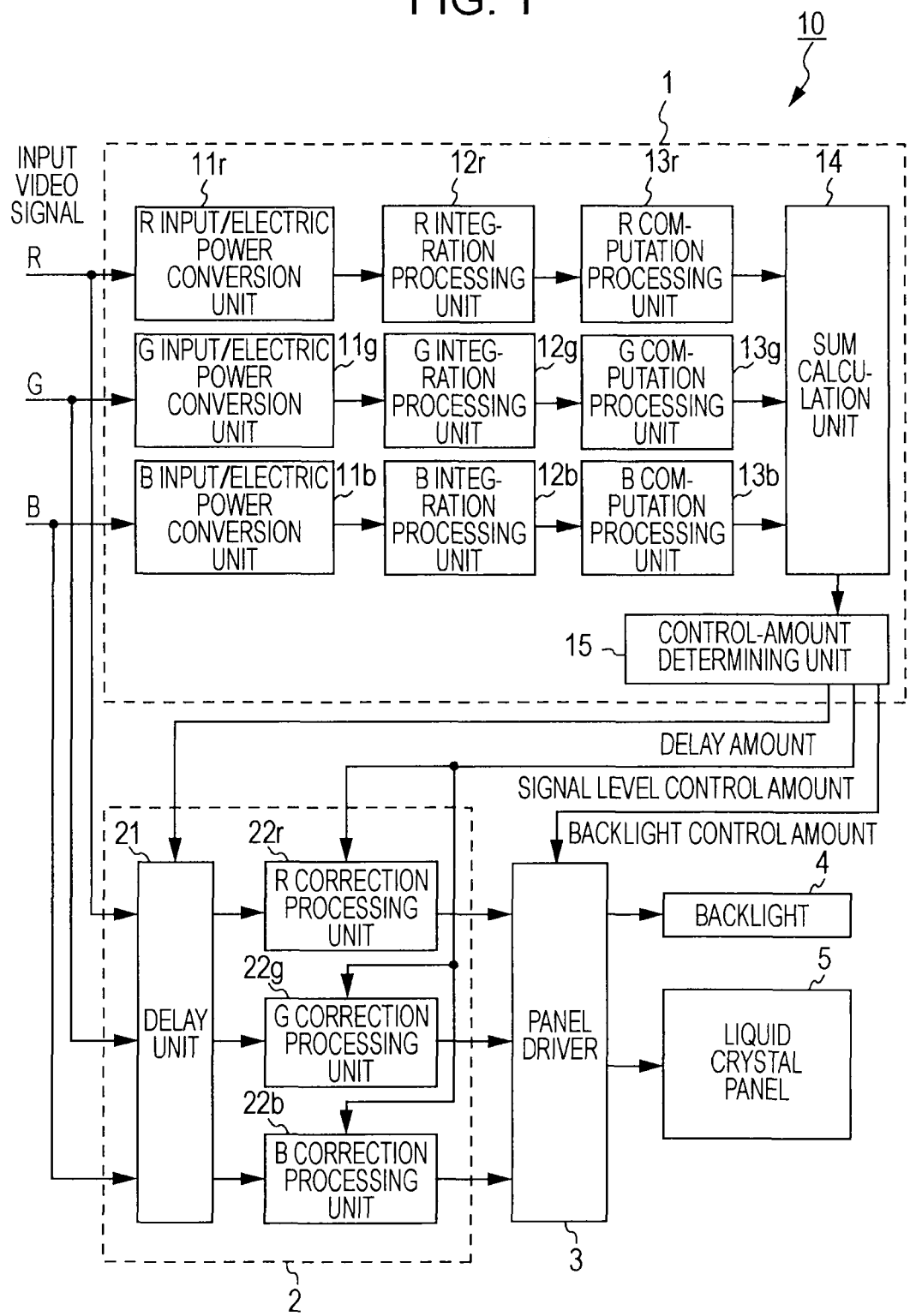
FIG. 1 is a block diagram showing an example internal structure of an image display apparatus according to an embodiment of the present invention.

Referring to FIG. 1, an image display apparatus 10 includes a level control amount calculating unit 1, a level correction processing unit 2, a panel driver 3, a backlight 4, and a liquid crystal panel 5. The panel driver 3 includes a gate line driving circuit and a data line driving circuit, both of which are not shown, and is configured to select a desired pixel electrode in the liquid crystal panel 5 and to apply a voltage to the pixel electrode. The backlight 4 has a light emitting diode (LED), an optical waveguide plate, and a reflecting sheet, all of which are not shown, and is configured to emit light onto a rear surface of the liquid crystal panel 5. In the present embodiment, the luminance of the backlight 4 can be adjusted using three control levels E1 (0.5), E2 (0.8), and 1 (no control). However, the control levels for the backlight 4 are not limited thereto, and any other number of control levels, such as two or four, may be used.

An example structure of the level control amount calculating unit 1 will now be described.

The level control amount calculating unit 1 calculates a control amount for controlling the level of display luminance on the basis of a pixel value of an input video signal. The level control amount calculating unit 1 includes a red (R) input/electric power conversion unit 11r, a green (G) input/electric power conversion unit 11g, a blue (B) input/electric power conversion unit 11b, a red (R) integration processing unit 12r, a green (G) integration processing unit 12g, and a blue (B) integration processing unit 12b. The level control amount calculating unit 1 further includes a red (R) computation processing unit 13r, a green (G) computation processing unit 13g, a blue (B) computation processing unit 13b, a sum calculation unit 14, and a control-amount determining unit 15.

The R input/electric power conversion unit 11r, the G input/electric power conversion unit 11g, and the B input/electric power conversion unit 11b perform a process of converting the pixel values of red, green, and blue input video signals (RGB input video signals) into electric power values, respectively. The electric power values calculated here are values of electric power that is consumed when no display luminance control is performed, and are hereinafter referred to as "equivalent electric power values v". Since the present embodiment will be described in the context of LCD-based reproduction of behavior on a PDP, the equivalent electric power values v are calculated according to characteristics obtained in a PDP when electric power is converted into optical power (hereinafter referred to as "electro-optical conversion characteristics").

A PDP has linear electro-optical conversion characteristics. Thus, if a pixel value of an input video signal is represented by x, an output luminance value with respect to the pixel value x of the input video signal has a proportional relationship to the amount of energy (electric power value) involved in displaying an image. The equivalent electric power values v can therefore be represented by a gamma curve as given by Equation 1 as follows:

$$v_i = a_i(x_i - b_i)^\gamma + c_i (i = r, g, b) \quad \text{Equation 1}$$

In Equation 1, coefficients a, b, c, and γ can be calculated on the basis of a luminance change characteristic with respect to the input pixel value x. The luminance change characteristic can be determined by measurement or the like.

Determined equivalent electric power values vr, vg, and vb are output to the R integration processing unit 12r, the G integration processing unit 12g, and the B integration processing unit 12b, respectively.

The R integration processing unit 12r, the G integration processing unit 12g, and the B integration processing unit 12b integrate the equivalent electric power values vr, vg, and vb output from the R input/electric power conversion unit 11r, the G input/electric power conversion unit 11g, and the B input/electric power conversion unit 11b over a certain period such as field or frame interval. The integration is performed using Equation 2 as follows:

$$V_i = \int v_i \, dt \quad \text{Equation 2}$$

Then, equivalent integrated electric power values Vr, Vg, and Vb obtained after the integration are output to the R computation processing unit 13r, the G computation processing unit 13g, and the B computation processing unit 13b, respectively.

The R computation processing unit 13r, the G computation processing unit 13g, and the B computation processing unit 13b perform a process of multiplying the equivalent integrated electric power values Vr, Vg, and Vb by correction coefficients λr, λg, and λb, respectively. The correction coefficients λr, λg, and λb are determined on the basis of the individual electro-optical conversion efficiencies of red, green, and blue light generation, respectively. Since the electro-optical conversion efficiencies of red, green, and blue light generation are different from one another, the relationship among the equivalent integrated electric power values Vr, Vg, and Vb is corrected using the correction coefficients λr, λg, and λb serving as weighting values which are calculated on the basis of the individual electro-optical conversion efficiencies. The R computation processing unit 13r outputs the resulting corrected value λrVr to the sum calculation unit 14. The G computation processing unit 13g outputs the resulting corrected value λgVg to the sum calculation unit 14. The B computation processing unit 13b outputs the resulting corrected value λbVb to the sum calculation unit 14.

The sum calculation unit 14 sums the values λrVr, λgVg, and λbVb output from the R computation processing unit 13r, the G computation processing unit 13g, and the B computation processing unit 13b to calculate a total equivalent electric power value P. The total equivalent electric power value P is calculated using Equation 3 as follows:

$$P = \lambda_r V_r + \lambda_g V_g + \lambda_b V_b \quad \text{Equation 3}$$

Then, the calculated total equivalent electric power value P is output to the control-amount determining unit 15.

The control-amount determining unit 15 calculates a delay amount on the basis of the total equivalent electric power value P output from the sum calculation unit 14. The delay amount is added to the video signal by a delay unit 21, which will be described below. The control-amount determining unit 15 further calculates a control amount for controlling the signal level of the video signal to be displayed on the liquid crystal panel 5 (hereinafter referred to as a "signal level control amount") and a control amount for controlling the luminance of the backlight 4 (hereinafter referred to as a "backlight control amount"). Then, the calculated delay amount is output to the delay unit 21. The calculated signal level control amount is output to a red (R) correction processing unit 22r, a green (G) correction processing unit 22g, and a blue (B) correction processing unit 22b in the level correction processing unit 2, which will be described below. The calculated backlight control amount is output to the panel driver 3.

The delay amount calculated here corresponds to a delay amount by which the output of the video signal is delayed in accordance with the time taken to calculate the signal level control amount and the backlight control amount. Alternatively, the characteristic of the input video signal that the temporal change is not generally abrupt is utilized and no delay amount may be set (or calculated) in order to avoid a display delay due to delay. In this case, the respective control amounts described above may be calculated using only information regarding previously input video signals.

The control-amount determining unit 15 calculates the signal level control amount and the backlight control amount by, first, comparing the value of the total equivalent electric power value P output from the sum calculation unit 14 with an allowable electric power value T serving as a threshold value for controlling display luminance. When the total equivalent electric power value P is equal to or greater than the allowable electric power value T, a signal level control amount and a backlight control amount are calculated so that the total equivalent electric power value P can be kept below the allowable electric power value T. When the total equivalent electric power value P is less than the allowable electric power value T, however, none of the above control amounts may be calculated because the total equivalent electric power value P is below the allowable electric power value T. In this case, no control amount is output to the level correction processing unit 2, and the pixel value x of the input video signal is directly output to the panel driver 3. Further, even when the total equivalent electric power value P is less than the allowable electric power value T, if control is performed because the electric power available for the display is determined to be sufficient, a control amount is calculated in accordance with the total equivalent electric power value P to perform control.

The allowable electric power value T refers to the amount of electric power that can allow a PDP to generate heat. The allowable electric power value T is set for each panel in accordance with the lifetime, electric power consumption, the amount of heat generated, or the like of the panel.

Figure 2:
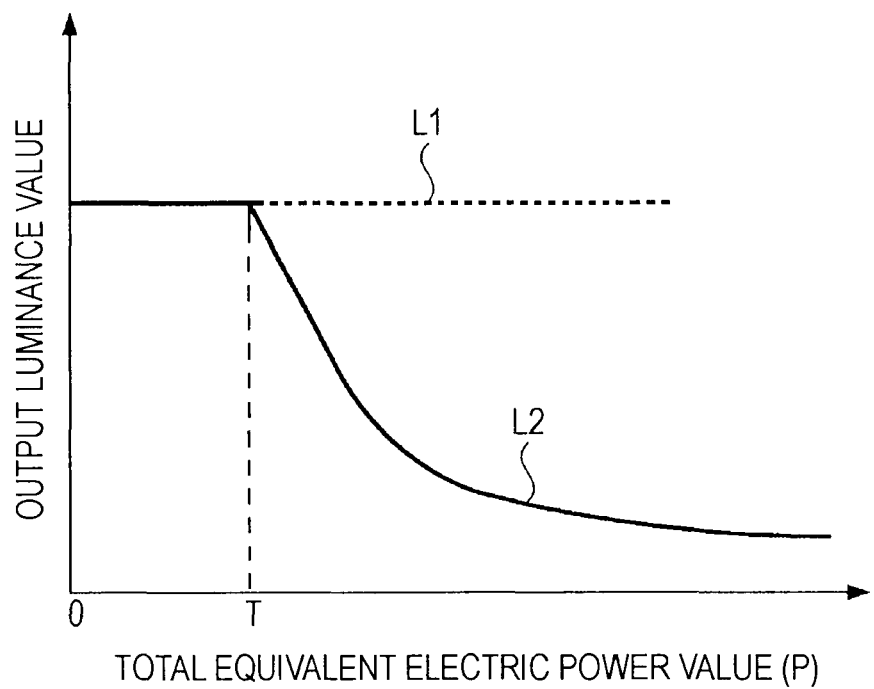
FIG. 2 is a characteristic diagram showing the relationship between a total equivalent electric power value and an output luminance value of a PDP according to an embodiment of the present invention.

FIG. 2 shows the relationship between an output luminance value obtained when a certain pixel value is input and the total equivalent electric power value P. In FIG. 2, the output luminance value is plotted on the ordinate, and the total equivalent electric power value P is plotted on the abscissa. As indicated by a line L1 including solid and broken lines, a display device not configured to perform display luminance control in accordance with the signal level of an input video signal exhibits a constant output luminance value regardless of the value of the total equivalent electric power value P. On the other hand, a display device configured to limit the output brightness value in accordance with the magnitude of a pixel value of an input video signal exhibits a constant output luminance value until the total equivalent electric power value P has reached the allowable electric power value T. After the total equivalent electric power value P has exceeded the allowable electric power value T, the output luminance value decreases in accordance with the value of the total equivalent electric power value P.

Figure 3:
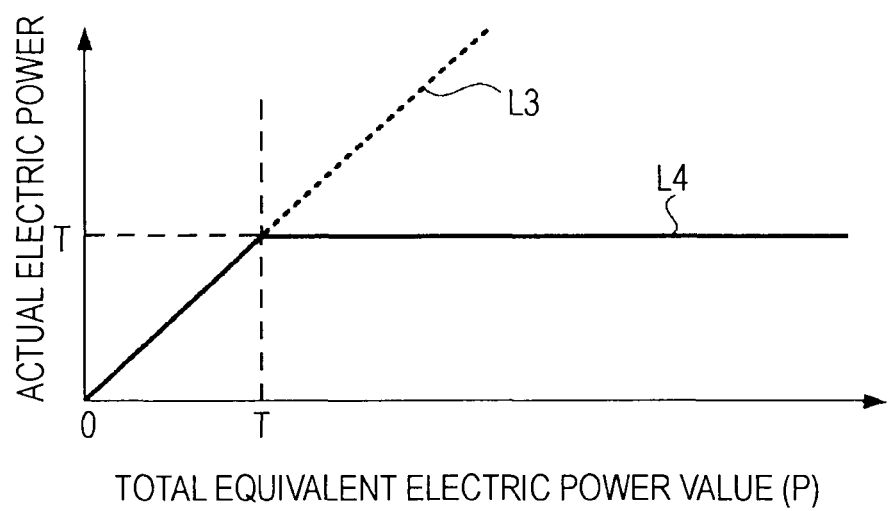
FIG. 3 is a characteristic diagram showing the relationship between a total equivalent electric power value and an actual amount of electric power consumption of a PDP according to an embodiment of the present invention.

FIG. 3 shows the relationship between the total equivalent electric power value P and the actual amount of electric power consumption of a PDP panel. The actual amount of electric power consumption is plotted on the ordinate, and the total equivalent electric power value P is plotted on the abscissa. For example, it is assumed that the area of a white portion displayed on a screen gradually increases. In case of no display luminance control in accordance with the amount of electric power, as indicated by a line L3 including solid and broken lines, as the total equivalent electric power value P increases due to an increase in the white display area, the actual amount of electric power consumption also increases.

When the total equivalent electric power value P exceeds the allowable electric power value T, however, the output luminance value is limited as indicated by a line L2 in FIG. 2, whereby, as indicated by a solid line L4 in FIG. 3, the actual amount of electric power consumption is reduced to the allowable electric power value T. Consequently, even when identical pixel values are input, an output luminance value different from an input luminance value is obtained. That is, in order to allow such behavior on a display device configured to limit display luminance in accordance with the magnitude of a pixel value of an input video signal to be reproduced using a display device not configured to limit display luminance, the control-amount determining unit 15 calculates a control amount for keeping the total equivalent electric power value P below the allowable electric power value T for PDPs.

As described above, in the present embodiment, the luminance of the backlight 4 is controllable using three levels. Thus, the amount of control for the signal level is adjusted in accordance with the value of a backlight control amount. In other words, the signal level control amount can be determined by calculating the value given by allowable electric power value T/total equivalent electric power value P/backlight control amount E. Specifically, when the value given by allowable electric power value T/total equivalent electric power value P (hereinafter referred to as "T/P") is 0.4, the backlight control amount is set to the value E1 (in this example, 0.5) to, first, halve the luminance of the backlight 4. The signal level control amount is changed by the same amount as that by which the luminance of the backlight 4 has been adjusted. That is, the signal level control amount T/P is multiplied by 1/E1, i.e., T/P/E1=0.4/0.5=0.8. The signal level control amount T/P is set to 0.8 so that the display state of an image displayed with the amount of electric power consumption kept below the allowable electric power value T can be obtained.

Figure 4:
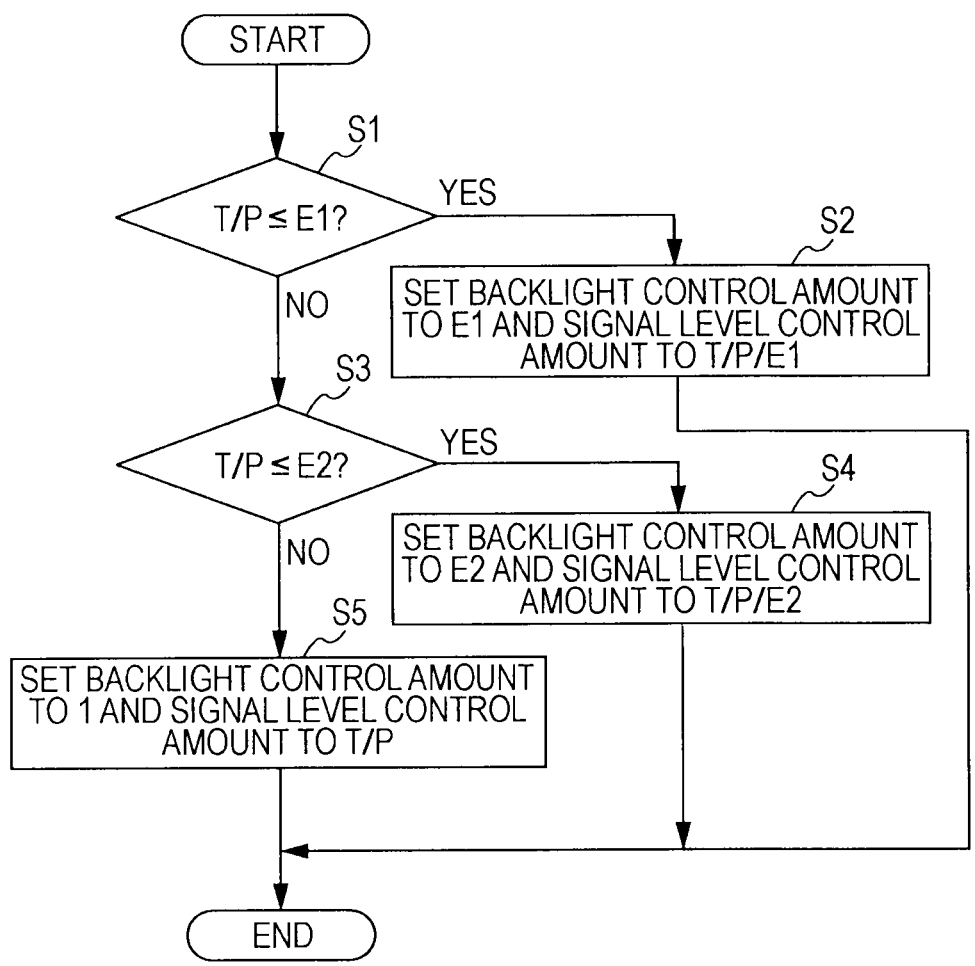
FIG. 4 is a flowchart showing an exemplary process for determining a signal level control amount and a backlight control amount according to an embodiment of the present invention.

FIG. 4 is a flowchart showing an exemplary process for determining a signal level control amount and a backlight control amount, which is performed by the control-amount determining unit 15. In the control-amount determining unit 15, first, it is determined whether or not T/P is equal to or less than the control amount E1 (in this example, 0.5) of the backlight 4 (step S1). If T/P is equal to or less than the control amount E1, the backlight control amount is set to E1 and the signal level control amount is set to T/P/E1 (step S2).

If T/P is greater than the backlight control amount E1, it is determined whether or not T/P is equal to or less than the backlight control amount E2 (in this example, 0.8) (step S3). If T/P is equal to or less than the control amount E2, the backlight control amount is set to E2 and the signal level control amount is set to T/P/E2 (step S4). If T/P is greater than the backlight control amount E2, the backlight control amount is set to 1 (no backlight control) and the signal level control amount is set to T/P (step S5).

An example structure of the level correction processing unit 2 will now be described.

The level correction processing unit 2 includes the delay unit 21, the R correction processing unit 22r, the G correction processing unit 22g, and the B correction processing unit 22b.

The delay unit 21 adds the delay amount output from the control-amount determining unit 15 to the input R, G, and B video signals, and outputs resulting video signals to the R correction processing unit 22r, the G correction processing unit 22g, and the B correction processing unit 22b.

Each of the R correction processing unit 22r, the G correction processing unit 22g, and the B correction processing unit 22b substitutes the signal level control amount output from the control-amount determining unit 15 and the pixel value x of the input video signal into Equation 4 below to calculate a signal level x' to be output:

$$x' = (T/P)^{1/\gamma}(x-b)+b \qquad \text{Equation 4}$$

The signal level x' to be output represents an output luminance value that is obtained when luminance characteristics are reproduced using a display device configured to limit display luminance in accordance with the magnitude of a pixel value of an input video signal. In the following description, the signal level x' to be output is also referred to as an "equivalent pixel value x'". In Equation 4, coefficients γ and b are identical to those in Equation 1.

Figure 5:
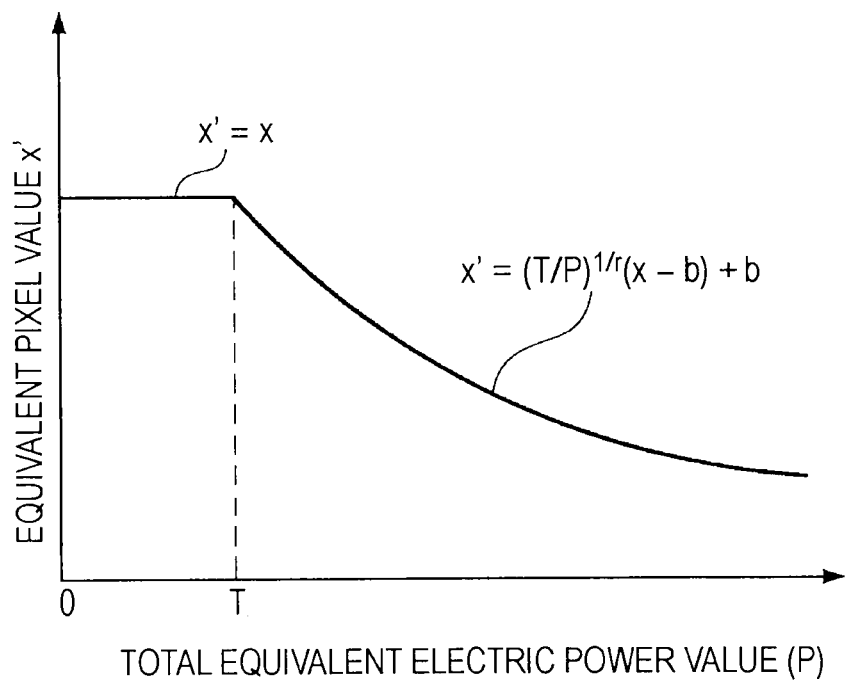
FIG. 5 is a characteristic diagram showing an exemplary relationship between a total equivalent electric power value and an equivalent pixel value according to an embodiment of the present invention.
Figure 6:
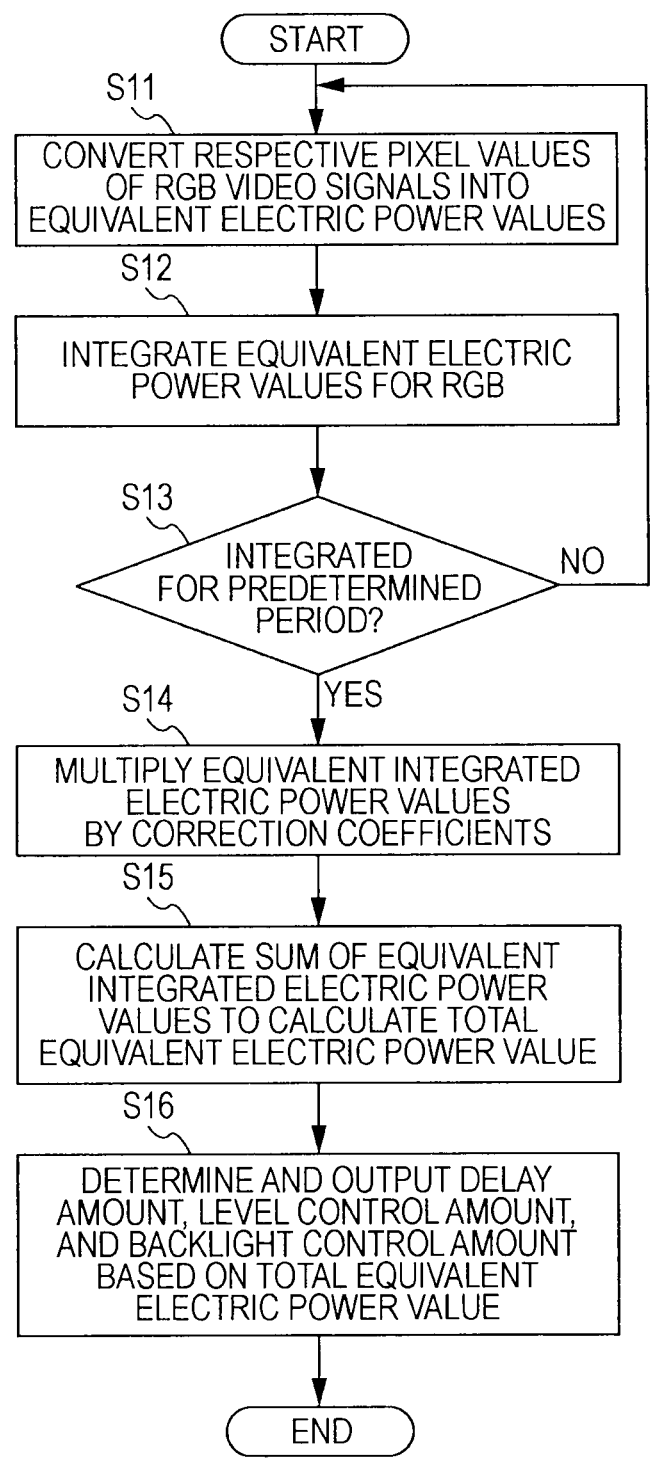
FIG. 6 is a flowchart showing an example of a control amount calculation process performed by a level control amount calculating unit according to an embodiment of the present invention.

FIG. 5 shows the relationship between the equivalent pixel value x' and the total equivalent electric power value P. In FIG. 5, the equivalent pixel value x' is plotted on the ordinate, and the total equivalent electric power value P is plotted on the abscissa. Since the control-amount determining unit 15 does not calculate a control amount until the total equivalent electric power value P has reached the allowable electric power value T, the pixel value x of the input video signal is directly output to the panel driver 3 as the equivalent pixel value x'.

When the total equivalent electric power value P exceeds the allowable electric power value T, a process of keeping the total equivalent electric power value P below the allowable electric power value T is performed. Specifically, the value P calculated using Equation 3 is multiplied by T/P so that the total equivalent electric power value P can be kept below the allowable electric power value T. If a total equivalent electric power value P obtained by performing the above process is represented by P', the total equivalent electric power value P' can be calculated using Equation 5 as follows:

$$P' = (T/P) \times P \qquad \text{Equation 5}$$

Here, by way of example, no backlight control amount is taken into account for simplicity of description. If a backlight control amount is taken into account, "T/P" is replaced with "T/P/E".

Here, if the values Vr, Vg, and Vb are multiplied by T/P regardless of the correction coefficients λr, λg, and λb in Equation 3, then P in Equation 5 can be replaced with Vi (i.e., Vr, Vg, and Vb). Further, when Equation 5 is modified using Equation 1, Equation 6 is obtained as follows:

$$\frac{T}{P} = \frac{V_i'}{V_i} = \frac{a_i(x_i' - b_i)^\gamma + c_i}{a_i(x_i - b_i)^\gamma + c_i} \quad \text{Equation 6}$$

When the equation is further modified by taking the fact that the coefficient $c_i$ is much smaller than $a_i(x_i-b_i)^\gamma$ into account, Equation 7 is obtained.

$$\frac{T}{P} = \frac{a_i(x_i' - b_i)^\gamma}{a_i(x_i - b_i)^\gamma} \quad \text{Equation 7}$$

When Equation 7 is further modified, Equation 4 is obtained. Note that in Equation 4, the subscript i of the variables are omitted. A curve that is defined by the equivalent pixel value x' calculated using Equation 4 is indicated by the solid line in FIG. 5. That is, when the total equivalent electric power value P exceeds the allowable electric power value T, the equivalent pixel value x' is limited using Equation 4. Accordingly, the image display apparatus 10 can reproduce an image to be displayed on a display device configured to limit display luminance in accordance with the magnitude of a pixel value of an input video signal.

Next, an example of the operation of the image display apparatus 10 will be described.

First, an example of the operation of the level control amount calculating unit 1 will be described. An exemplary process for calculating control amounts, which is performed by the level control amount calculating unit 1, will be described with reference to a flowchart shown in FIG. 6. First, the R input/electric power conversion unit 11r, the G input/electric power conversion unit 11g, and the B input/electric power conversion unit 11b convert the respective pixel values of the input R, G, and B signals into equivalent electric power values vr, vg, and vb, respectively (step S11). Then, the R integration processing unit 12r, the G integration processing unit 12g, and the B integration processing unit 12b integrate the equivalent electric power values vr, vg, and vb to produce equivalent integrated electric power values Vr, Vg, and Vb, respectively (step S12).

Then, it is determined whether or not the integration has been performed for a predetermined period (step S13). If the integration has not yet been performed for the predetermined period, the process returns to step S11 and continues. If the integration has been performed for the predetermined period, the R computation processing unit 13r, the G computation processing unit 13g, and the B computation processing unit 13b multiply the equivalent integrated electric power values Vr, Vg, and Vb by the correction coefficients λr, λg, and λb, respectively (step S14).

Then, the sum calculation unit 14 sums the corrected values Vrλr, Vgλg, and Vbλb to calculate a total equivalent electric power value P (step S15). Finally, the control-amount determining unit 15 determines a delay amount, a signal level control amount, and a backlight control amount on the basis of the total equivalent electric power value P calculated by the sum calculation unit 14, and outputs the delay amount, the signal level control amount, and the backlight control amount to the level correction processing unit 2 and the panel driver 3 (step S16).

Next, an example of the operation of the level correction processing unit 2 will be described.

Figure 7:
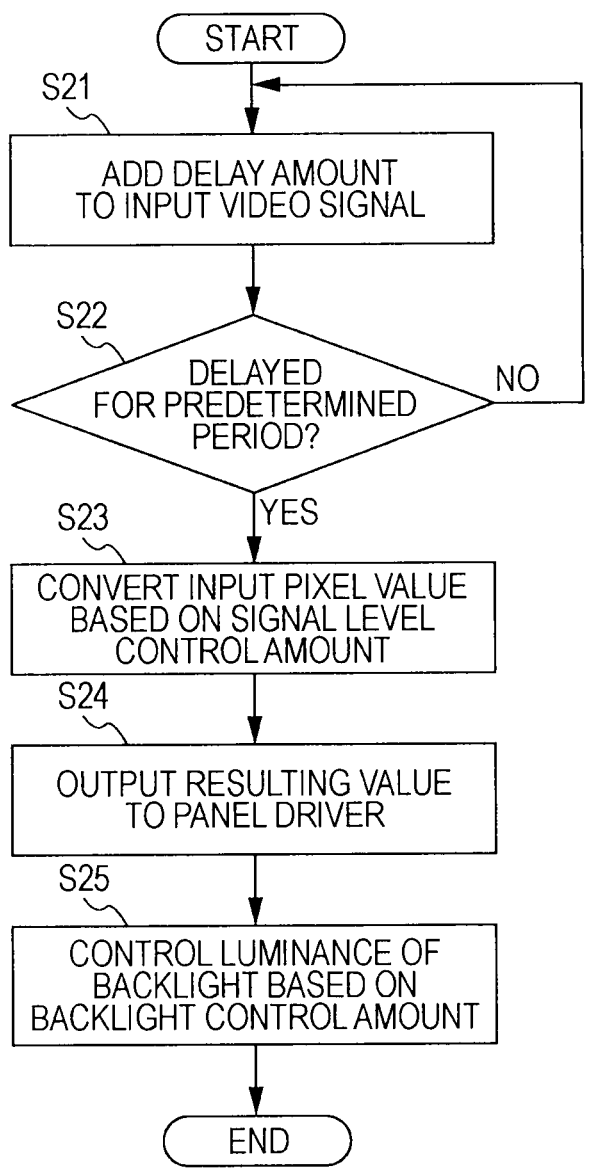
FIG. 7 is a flowchart showing an example of a correction process performed by a level correction processing unit according to an embodiment of the present invention.

An exemplary level correction process performed by the level correction processing unit 2 will be described with reference to a flowchart shown in FIG. 7. In the level correction processing unit 2, first, the delay unit 21 adds the delay amount determined by the control-amount determining unit 15 to the input R, G, and B video signals (step S21). Then, it is determined whether or not the input R, G, and B video signals have been delayed for a predetermined period (step S22). If the input R, G, and B video signals have not been delayed for the predetermined period, the process returns to step S21 and continues.

If the input R, G, and B video signals have been delayed for the predetermined period, the respective pixel values x of the R, G, and B video signals are converted into equivalent pixel values x' on the basis of the signal level control amount output from the control-amount determining unit 15 (step S23), and the equivalent pixel values x' are output to the panel driver 3 (step S24). The luminance of the backlight 4 is further controlled on the basis of the backlight control amount output from the control-amount determining unit 15 (step S25).

According to the embodiment described above, a pixel value x of an input video signal is converted into a total equivalent electric power value P serving as an amount of energy involved in displaying an image. Then, when the total equivalent electric power value P exceeds an allowable electric power value T for a display device having the peak luminance characteristic, such as a PDP, the total equivalent electric power value P is controlled so as to be kept below the allowable electric power value T. Therefore, an image to be displayed on a display device configured to limit display luminance in accordance with the magnitude of a pixel value of an input video signal, such as a PDP, can be reproduced using a display device not configured to limit display luminance, such as the image display apparatus 10 according to the present embodiment.

Further, according to the embodiment described above, first, equivalent electric power values vr, vg, and vb serving as amounts of energy involved in displaying R, G, and B colors are calculated on the basis of R, G, and B video signals, respectively. Then, the equivalent electric power values vr, vg, and vb are multiplied by correction coefficients λr, λg, and λb that are determined on the basis of individual electro-optical conversion efficiencies of red, green, and blue light generation, respectively, and a total equivalent electric power value P is calculated on the basis of the resulting values. This enables accurate calculation of the amount of energy involved in the display. Therefore, behavior on a display device such as a PDP can be more precisely reproduced using the image display apparatus 10 which may be implemented by an LCD or the like.

Furthermore, according to the embodiment described above, the image display apparatus 10 which may be implemented by an LCD or the like can be used to reproduce an image to be displayed on a display device configured to limit display luminance in accordance with the magnitude of a pixel value of an input video signal, such as a PDP. Therefore, a user can use only the image display apparatus 10 which may be implemented by an LCD or the like to check both an image to be displayed on a display device configured to limit display luminance in accordance with the magnitude of a pixel value of an input video signal and an image to be displayed on a display device not configured to limit display luminance. Therefore, a plurality of types of display devices are no longer necessary for quality checks on individual types of display devices for which the quality of images to be displayed is to be checked.

Moreover, according to the embodiment described above, the level of display luminance is controlled using both the luminance of the backlight 4 and the signal level of a video signal. Display luminance control performed only by controlling the signal level of a video signal can cause gradation collapse in a display screen when the luminance is greatly reduced. In contrast, in the image display apparatus 10 according to the present embodiment, the backlight 4 can be adjusted to greatly limit display luminance. Therefore, an image to be displayed on a display device such as a PDP can be reproduced without causing gradation collapse.

In the embodiment described above, the level of display luminance is controlled using both the luminance of the backlight 4 and the signal level of a video signal. The level of display luminance can also be controlled using only the signal level of a video signal. Alternatively, in a case where the luminance of the backlight 4 is controllable using a larger number of levels, display luminance control may be performed only by controlling the backlight 4.

Further, in the embodiment described above, colors of an image to be displayed on a screen are not corrected. Alternatively, colors may be corrected as desired. Specifically, in a case where a change in the luminance of the backlight 4 changes a color of a displayed image, a color correction value may be calculated in accordance with the value of the backlight control amount, and a color correction may be performed using the calculated color correction value.

Furthermore, in the embodiment described above, the values of the coefficients a, b, c, and γ given in Equation 1 are commonly used for RGB colors. Alternatively, for example, in a case where characteristics for RGB colors are greatly different, the values of the coefficients a, b, c, and γ may be individually set for each of RGB colors.

Moreover, in the embodiment described above, an image to be displayed on a PDP is reproduced by way of example. An image to be displayed on any other display device configured to limit display luminance in accordance with the magnitude of a pixel value of an input video signal, such as an organic EL display or a CRT display, may be reproduced.

The series of processes described above can be performed by hardware or software. When the series of processes is performed by software, a program constituting the software is installed into a general-purpose computer or the like.

Figure 8:
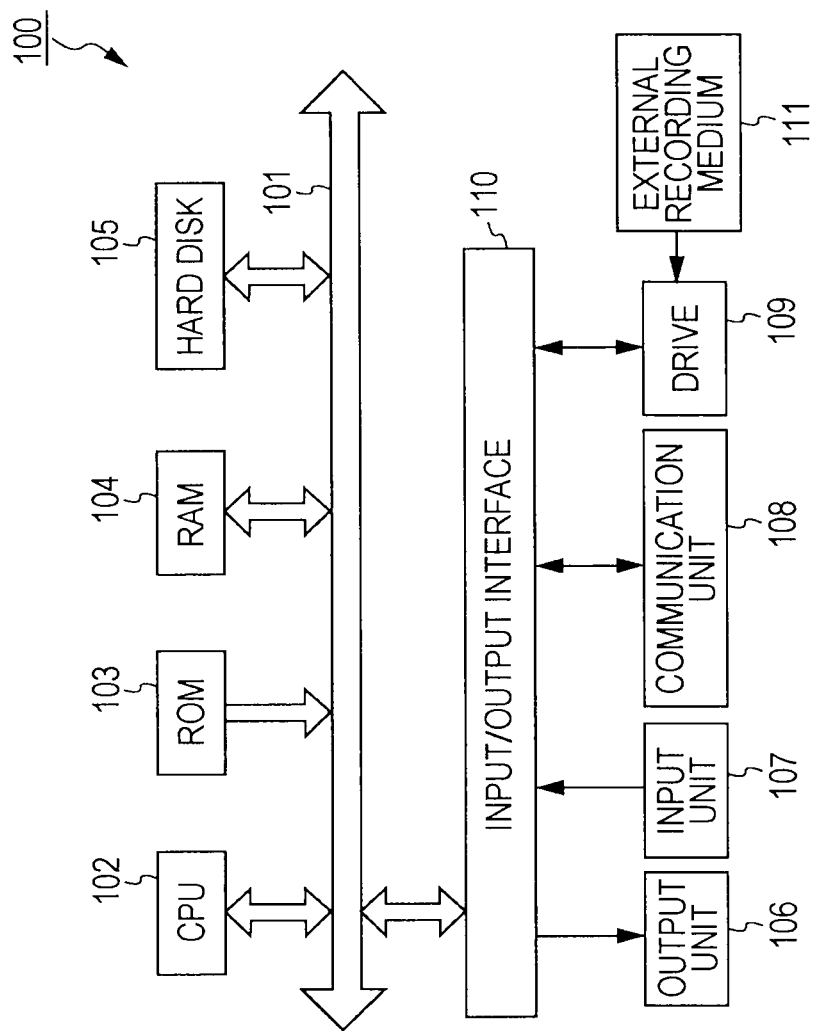
FIG. 8 is a block diagram showing an example structure of a personal computer.
Figure 9:
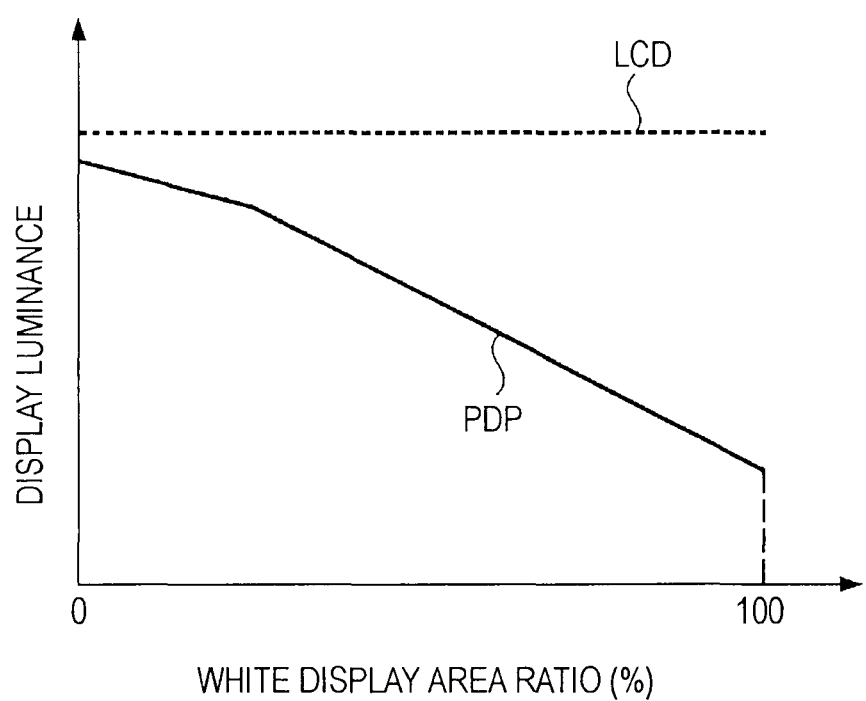
FIG. 9 is a characteristic diagram showing the relationship between the white display area ratio and display luminance of a PDP of the related art.

FIG. 8 shows an example structure of a personal computer 100 according to an embodiment of the present invention into which a program for executing the series of processes described above is installed.

The program can be recorded in advance on a hard disk 105 or a read only memory (ROM) 103 serving as an internal recording medium of the personal computer 100.

Alternatively, the program can be temporarily or permanently stored (or recorded) in an external storage medium 111. Examples of the external storage medium 111 may include a flexible disk, a compact disc read only memory (CD-ROM), a magneto optical (MO) disk, a digital versatile disc (DVD), a magnetic disk, and a semiconductor memory. The external storage medium 111 can be provided as so-called packaged software.

The program can also be transferred from a download site to the personal computer 100 in a wireless manner via a satellite for digital satellite broadcasting as well as can be installed into the personal computer 100 from the external storage medium 111 in the manner described above. The program can also be transferred to the personal computer 100 in a wired manner via a network such as a local area network (LAN) or the Internet. In the personal computer 100, the program transferred in this manner can be received by a communication unit 108 and can be installed into the hard disk 105 incorporated in the personal computer 100.

The computer incorporates therein a central processing unit (CPU) 102 to which an input/output interface 110 is connected via a bus 101. A user operates an input unit 107 including a keyboard, a mouse, and a microphone, thereby entering a command to the CPU 102 through the input/output interface 110. The CPU 102 executes a program stored in the ROM 103 in accordance with the command.

The CPU 102 further reads the program and loads the program onto a random access memory (RAM) 104 for execution. The program read here may be a program stored in the hard disk 105, a program received by the communication unit 108 and installed into the hard disk 105, or the like. Alternatively, the program may be read from the external storage medium 111 attached to a drive 109 and may be installed into the hard disk 105.

The CPU 102 performs processes according to the flowcharts described above or processes that are performed using the structures shown in the block diagrams described above. Then, the CPU 102 outputs a processing result from an output unit 106 such as an LCD and speakers, as desired, through the input/output interface 110. Alternatively, a processing result may be sent from the communication unit 108 or recorded onto the hard disk 105.

The present application contains subject matter related to that disclosed in Japanese Priority Patent Application JP 2008-158282 filed in the Japan Patent Office on Jun. 17, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a display unit that includes a display panel on which an image based on an input video signal is displayed, the display panel having pixels, and a backlight for emitting light onto the display panel;
a control amount calculating unit configured to calculate an equivalent electric power value using a pixel value of the input video signal, the equivalent electric power value corresponding to an amount of energy involved when the image based on the video signal is displayed on the display unit, and to calculate a control amount for controlling display luminance of the display unit so that the equivalent electric power value becomes equal to a predetermined value, wherein the predetermined value is an allowable electric power value that is allowed to be consumed by a display device which does not use a backlight for emitting light onto the display panel and which is configured to limit display luminance in accordance with a magnitude of the pixel value of the input video signal; and
a correction processing unit configured to control the display luminance using the control amount calculated by the control amount calculating unit, wherein
the equivalent electric power value is calculated using an electro-optical conversion characteristic of a display device configured to limit display luminance in accordance with a magnitude of the pixel value of the input video signal, the control amount calculating unit determines a control amount for a signal level of the video signal by performing calculation of the equivalent electric power value on each of red, green, and blue video signals to produce red, green, and blue equivalent electric power values and multiplying the red, green, and blue equivalent electric power values by weighting values determined using electro-optical conversion efficiencies for red, green, and blue, the control amount calculating unit compares the equivalent electric power value with the allowable electric power value, and calculates the control amount when the equivalent electric power value exceeds the allowable electric power value;

when the equivalent electric power value exceeds the allowable electric power value, the control amount calculating unit calculates the control amount for the signal level using a value obtained by dividing the allowable electric power value by the equivalent electric power value;

the control amount calculating unit calculates a control amount for luminance of the backlight in addition to the control amount for the signal level of the video signal;

the control amount calculating unit calculates the control amount for the signal level of the video signal and the control amount for the luminance of the backlight so that one of the control amounts is determined in accordance with the other control amount; and wherein when the equivalent electric power value exceeds the allowable electric power value and when the value obtained by dividing the allowable electric power value by the equivalent electric power value is greater than a maximum control level of the backlight, the control amount calculating unit determines, as the control amount for the signal level of the video signal, a value obtained by dividing the allowable electric power value by the equivalent electric power value to produce a calculation result and further dividing the calculation result by a control level of the backlight.

2. An image processing apparatus comprising:

a control amount calculating unit configured to calculate an equivalent electric power value using a pixel value of an input video signal, the equivalent electric power value corresponding to an amount of energy involved when an image based on the video signal is displayed on a display unit, and to calculate a control amount for controlling display luminance of the display unit so that the equivalent electric power value becomes equal to a predetermined value, wherein the predetermined value is an allowable electric power value that is allowed to be consumed by a display device configured to limit display luminance in accordance with a magnitude of the pixel value of the input video signal; and a correction processing unit configured to control the display luminance using the control amount calculated by the control amount calculating unit, wherein when the equivalent electric power value exceeds the allowable electric power value and when a value obtained by dividing the allowable electric power value by the equivalent electric power value is greater than a maximum control level of the backlight, the control amount calculating unit determines, as the control amount for the signal level of the video signal, a value obtained by dividing the allowable electric power value by the equivalent electric power value to produce a calculation result and further dividing the calculation result by a control level of the backlight.

* * * * *